J. N. TATUM & R. C. HARVEY.
Feed-Cutter.
No. 212,764.  Patented Feb. 25, 1879.
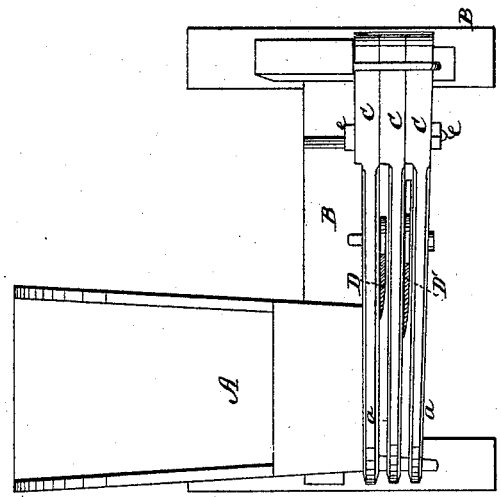
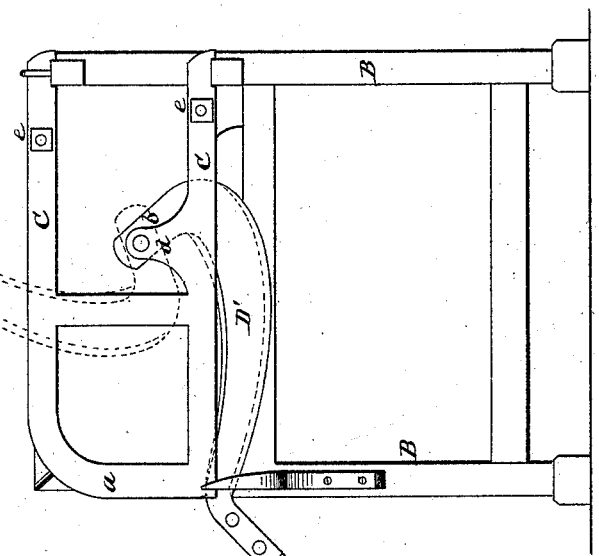

UNITED STATES PATENT OFFICE.

JAMES N. TATUM AND RICHARD C. HARVEY, OF DANVILLE, VIRGINIA.

IMPROVEMENT IN FEED-CUTTERS.

Specification forming part of Letters Patent No. 212,764, dated February 25, 1879; application filed June 3, 1878.

*To all whom it may concern:*

Be it known that we, JAMES N. TATUM and RICHARD C. HARVEY, of Danville, in the county of Pittsylvania and State of Virginia, have invented a new and Improved Feed-Cutter; and we do hereby declare that the following is a full, clear, and exact description of the same.

The invention is an improvement in the class of feed-cutters in which two or more knives work between parallel bars attached to the box in which the material is placed to be cut.

The invention consists in the arrangement of the knives with relation to each other, whereby one begins and finishes its cut in advance of the other.

In the accompanying drawings, forming part of this specification, Figure 1 is a front elevation of the machine. Fig. 2 is a plan view of the stationary portion of the machine, with the knives in cross-section.

The trough or box A is constructed in the usual form, and supported by a frame, B, which is extended laterally from the front end of the box, to adapt it for attachment and support of the metal skeleton-frames C, between which the knives or cutters D D' work. Said frames are so constructed at one end, $a$, as to nearly conform to the shape of the opening in the throat of the machine, and are so arranged that such part $a$ forms, practically, a continuation of the throat.

The frames C are cut away on one side for a portion of their length, to form slots or ways for the knives D D'. The latter have convex cutting-edges, and are provided with an elbow or angular shank, $b$, by which they are pivoted to the arms $d$ of frames C. Said arms project vertically from the middle portion of the lower bars of the frames, so that the pivotal point of the cutters is about midway of the length and width of the frames. The shanks of the cutters are at right angles, or nearly so, to the median line of the blades of the knives.

The knives are connected to and operated by the same handle E; but the edge of the outer knife, D', is lower than the edge of the inner one, D, so that the outer knife, D', will be the first to begin and finish its cut.

The operation of the knives is more particularly as follows: The knives being raised into nearly vertical position, the straw, hay, corn-fodder, or other product to be cut into fine feed is pushed through the throat of the machine until it projects slightly beyond the outer knife, D'. The handle E is then depressed, and the latter begins its cut a little in advance of the inner knife, D, and, obviously for that reason, first completes its cut. The knives, therefore, act in succession, and also simultaneously.

The form and manner of pivoting and arranging the knives cause them to make a circular cut, and also a positive draw-cut, which is independent of the circular cut. They are therefore operated with great effect by the expenditure of less force than would be required if they made the cut in any other manner.

The frames C may be easily detached, and also the knives D, by withdrawing the bolts $e\ e$.

What we claim is—

The combination, with the box or trough of a feed-cutter, of two or more knives pivoted side by side and arranged parallel, and the edge of the outer knife being lower than the edge of the inner one, as and for the purpose specified.

JAMES N. TATUM.
RICHARD C. HARVEY.

Witnesses:
C. W. GOODSON,
A. G. TAYLOR.